United States Patent [19]

Schreiber

[11] Patent Number: 4,478,771

[45] Date of Patent: Oct. 23, 1984

[54] METHOD OF MANUFACTURING FIBRE-REINFORCED PLASTIC ARTICLES, A PREPREG FOR THE MANUFACTURE OF FIBRE-REINFORCED PLASTIC ARTICLES AND A FIBRE-REINFORCED PLASTIC ARTICLE

[76] Inventor: Herbert Schreiber, Seeblick 3, 8832 Wollerau, Switzerland

[21] Appl. No.: 356,442

[22] Filed: Mar. 9, 1982

[30] Foreign Application Priority Data

Apr. 12, 1981 [DE] Fed. Rep. of Germany ....... 3109424

[51] Int. Cl.³ ............................................. H05B 1/00
[52] U.S. Cl. ...................................... 264/22; 264/25; 264/137; 264/257; 264/510; 264/552; 428/284; 428/285; 428/297; 428/298; 428/302
[58] Field of Search ................... 264/22, 25, 136, 137, 264/257, 324, 510, 553, 571, 552; 428/297, 298, 301, 302, 303, 284, 285, 287, 425.6, 74, 290, 426

[56] References Cited

U.S. PATENT DOCUMENTS

| | | | |
|---|---|---|---|
| 4,012,553 | 3/1977 | Clemens | 428/285 |
| 4,054,713 | 10/1977 | Sakaguchi et al. | 428/285 |
| 4,178,406 | 12/1979 | Russell | 428/285 |
| 4,201,612 | 5/1980 | Figge et al. | 264/257 |
| 4,207,282 | 6/1980 | Grisch | 264/257 |
| 4,311,753 | 1/1982 | Pucci | 428/285 |

Primary Examiner—James J. Bell
Attorney, Agent, or Firm—Charles A. Brown

[57] ABSTRACT

A method of manufacturing fibre-reinforced plastic articles out of prepregs, prepregs for the manufacture of fibre-reinforced plastic articles and fibre-reinforced plastic articles manufactured by such method. The prepregs contain glass-fibre mats having a fiber length of preferably 4 to 30 mm and a curable resin having a preferred viscosity in the range between 100 and 100 000 Ns/m². The prepregs are shaped in a mold by vacuum forming and are cured by UV-light.

29 Claims, No Drawings

METHOD OF MANUFACTURING FIBRE-REINFORCED PLASTIC ARTICLES, A PREPREG FOR THE MANUFACTURE OF FIBRE-REINFORCED PLASTIC ARTICLES AND A FIBRE-REINFORCED PLASTIC ARTICLE

BACKGROUND OF THE INVENTION

1. FIELD OF THE INVENTION

The present invention relates to a method of manufacturing fibre-reinforced plastic articles by deforming a planar prepreg containing fibres impregnated by curable resins. It also relates to a prepreg for the manufacture of fibre-reinforced plastic articles by deformation thereof. It relates further to fibre-reinforced plastic articles containing fibres impregnated by a cured resin.

2. DESCRIPTION OF THE PRIOR ART

Prepregs consisting of fibre mats which are impregnated by curable resins have commonly been treated by a pressing thereof in heated molds. Such method has, however, numerous drawbacks. A first drawback is that due to the necessary exact corresponding shapes of the upper and the lower mold or die, respectively, such molds are extremely expensive. Furthermore, a minimal thickness of the space between the two mold parts and accordingly the thickness of the therewith manufactured articles cannot be chosen arbitrarily small, there is a lower limit thereof because otherwise the flow of the reinforced material would be detrimentally affected. For this reason, for instance, a saving on weight in the manufacture of parts of vehicles made from fibre-reinforced plastic articles could not be realized completely and the application of such parts has been restricted to thick walled parts.

SUMMARY OF THE INVENTION

Hence, it is a general object of the present invention to provide an improved method for the manufacture of fibre-reinforced plastic articles. A further object is to provide a prepreg for the manufacture of fibre-reinforced plastic articles consisting of curable resins and fibres. Yet a further object is the provision of a fibre-reinforced plastic article containing a cured resin reinforced by fibres.

Now, in order to implement these and still further objects of the invention, which will become more readily apparent as the description proceeds, the method of this development is manifested by the features comprising the manufacturing steps of covering at least one side of a prepreg by a flexible and stretchable foil, of pressing said covered prepreg by means of exertion of a fluid pressure tightly onto a at one side open form and of curing said prepreg thereafter, whereby the viscosity of the totality of the flowable materials present in said prepreg, inclusive possible filling agents however exclusive any reinforcing fibres, and measured at the deformation temperature and at a low shearing speed amounts to about at least 10 Ns/m$^2$, and less than about 500 000 Ns/m$^2$, and the length of said individual reinforcing fibres exceeds about 2 mm. The procedure of a so-called vacuum shaping which is widely used for shaping thermoplastic materials: the prepreg is arranged in a shaping mold which is open at one side and is airtightly pressed onto the edge of such mold. By means of exerting a vacuum, a subatmospheric pressure between mold and prepreg the prepreg abuts tightly such mold and can be cured thereafter. Any method or procedure according to which a shaping is achieved by pneumatic pressure differentials acting directly onto a prepreg is commonly considered as an equivalent to mentioned vacuum shaping.

Mentioned method is specifically advantageous if a material is utilized which can be cured by influence of rays. This allows an exceeding speedy and energy saving curing or hardening, respectively. Furthermore, it is possible to exclude predetermined areas from the curing by a shielding thereof, for instance, such lines along which the workpiece must be cut apart during a further working or handling thereof. A UV- and light curing can be carried out at polymerizable resins generally by the addition of corresponding sensitizing agents. Many resins can be cured by electron beam due to their general composition.

When applying resins which are curable by UV-rays and by light rays, the reinforcing fibres used therein must be of a material which can be penetrated by said rays. Suitable fibres are such of glass, of quartz and of a synthetic material. The relative amount of fibres lies within the commonly known limits of about 10 to 50 percent by weight glass fibres. A specific simple execution of the method is achieved if the prepreg is covered at both sides by a thin, easily stretchable foil. Thereby it is possible to use a foil which can easily be detached from the hardened shaped article, for instance, such foil be a low-crystalline polyolefine foil or a polyvinylidenchloride foil.

An extremely useful modification of the method comprises the use of a covering foil which adheres to the cured resin extremely strongly such that this foil can be left onto the finished article in form of a covering layer. Articles of an especially high quality are arrived at if such covering foil is a PVC-foil having a content of polymerizable monomers, for instance, multiple functional methacryl esters. According to this method it is possible to manufacture decoratively colored surfaces which are impervious to light. A decoratively colored fine layer may, however, also be inserted as integral part of the prepreg below a detachable foil. In both cases a thermic curing of such layer is generally necessary. Such curing can be carried out simultaneously with or immediately following the light ray hardening, possibly also after the opening of the mold.

DETAILED DESCRIPTION OF PREFERRED EMBODIMENTS

The present invention will be more fully understood by reference to the following detailed description of examples thereof.

Example 1

A prepreg is manufactured from a homogeneous fill of 450 g/m$^2$ glass fibres of a length of 13 mm and by an impregnation with 1340 g/m$^2$ styrene containing UP-resin* between two thin soft-polyethylene foils or polyvinylidenchloride foils. The UP-resin contains 1.5% of a UV-sensitizer. Furthermore, immediately prior to mentioned impregnation 2.6% of a powdery cellulose-aceto-butyrate is mixed into the UP-resin. This mixture attains by a non-presence of glass fibres and after a complete dissolving of the cellulose ester a viscosity of 100 poise (=10 Nsm$^{-2}$) measured by a Brookfield viscosimeter, spindel 7, 10 to 100 rpm. The not thickened resin has a viscosity of 6 poise (=0.6 Nsm$^{-2}$).

* unsaturated polyester resin

The prepreg is arranged in a mold die, pressed against such die at the edge and sucked into the die by exerting a vacuum or subatmospheric pressure, respectively, by means of bore holes present in the die. This forming or shaping, respectively, is ended after a few seconds. Thereafter, the shaped article is exposed to UV-light rays. The curing is completed depending on the intensity of the light source within 1 to 10 minutes, whereafter the shaped article can be taken out of the die. After the curing the PE-foil can be peeled off quite easily. Due to the relative low viscosity a flowing of the resin to the more strongly stretched areas appears in this prepreg and leads at such areas to high resin concentrations. Conclusively, the application of this prepreg is confined to shaped articles having no radius of curvature amounting to less than 15 mm.

Example 2

A prepreg is manufactured and treated such as mentioned in Example 1 above. However, now 6.7% cellulose ester is admixed to the UP-resin, corresponding to a viscosity of 4800 poise (=480 $Nsm^{-2}$) measured by a Brookfield apparatus, spindel 7, 0.5 rpm. This prepreg can be sucked without any difficulties also into extemely sharply curved dies and copies curvatures of less than 1 mm at a stretching of 100% exactly according to the shape of the die. This example proves the superiority of the prepreg having a resin with higher viscosity.

Example 3

A prepreg is manufactured and treated such as set forth in Example 1, however now with a content of 11.8% cellulose-ester. This corresponds to a viscosity of the resin of 45 000 poise (=4500 $Nsm^{-2}$) measured by a Brookfield apparatus, spindel 7, 0.5 rpm. Also this prepreg lends itself quite easily to a vacuum forming. The smallest radius of curvature which is still true to the form amounts to 5 mm at narrow areas and to 2.5 mm at broad areas.

Example 4

A prepreg is manufactured and treated such as set forth in Example 2, however in this case glass fibres of a length of 30 mm are used. The formability is somewhat inferior than that of Example 2. The smallest possible radius of curvature amounts at narrow areas to 6 mm and at broad areas to 2.5 mm.

Example 5

A prepreg is manufactured and treated such as set forth in Example 2, however now by using a glass fibre mat having a length of fibres of 50 mm. The formability is still good, however distinctly worse than in Example 2. Also at broad areas radiuses of curvature can achieved true to form with a radius of at least 6 mm. However, specifically in this prepreg the flowing of the resin is again markedly larger.

Example 6

A prepreg is manufactured and treated such as set forth in Example 2. This prepreg is, however, covered by a soft PVC-foil at the side facing the die. This foil contains per 100 parts PVC 50 parts DOP and 50 parts trimethylolpropane-trimethacrylate and 1 part benzoyl peroxide. After photo-hardening and taking out of the die, this shaped article is further cured at a temperature of 100° C. during 20 minutes. The PE-foil can be peeled off very easily. The PVC-foil forms a smooth cover which is extremely scratch resistent and which adheres excellently.

Example 7

A prepreg is manufactured and treated such as set forth in Example 2. However, prior to the filling of the glass fibres a UP fine layer of about 1 mm thickness is deposited onto one of the covering foils. This layer consists of a UP-resin having a small shrinkage during curing, which resin contains 1.5% benzoyl peroxide and which is thickened by an additive consisting of finely ground quartz to a thin paste like consistence. A pigment which is not penetratable by UV may be admixed to this fine layer. The prepreg is treated such as set forth in Example 1, whereby the side thereof carrying the fine layer faces the die. After the photo curing or simultaneously therewith the article is heated by a IR-rays to about 100° C. during 20 minutes. After the peeling off of the covering foil this shaped article shows an impeccable, smooth, true to die surface shape.

The information regarding the viscosities made in the claims as well as in the specification refers to the totality of the flowable materials in the prepregs. The totality of the flowable materials is to be understood as the mixture of all constituents of a prepreg exclusive of the reinforcing fibres and the covering foils as well, if present, exclusive of mentioned fine layer. Generally, these are mixtures or solutions of the liquid curable resin with a thickening agent and further additives such as thixotropic agents, sensibizators, accelerators, stabilizers, coloring pigments and possibly also solid filling agents, as far as such form together with the resin a flowable mixture Filling agents are to be understood as being also fine solid additives having a fibrous structure such as cellulose, powdered asbestos or ground glass fibres as far as they form together with the resin a flowable mixture.

In case of plastically flowing mixtures which feature a liquid or flow limit the viscosity figures refer to the true viscosity which is reached in a known way from the inclination or gradient, respectively, of the shearing strain-shearing-speed-curve above the flow limit. In case of thixotropic mixtures that viscosity must be considered which is measured after a period of rest.

The upper limit of the viscosities of the flowable materials contained in the prepreg is about 1 000 000 poise (100 000 $Ns/m^2$). At any rate, the resin mixtures must be flowable at the deformation or shaping, respectively, temperature and not solid. This is proven by the following comparison test.

Comparison Test

A prepreg manufactured as set forth in Example 3 was left to lie exposed to the ambient air until due to the evaporation of the styrene a weight loss of 20% referred to the mixture of cellulosic ester and UP-resin was attained. This prepreg was no longer suitable for a vacuum shaping. Viscosity of 5 000 000 poise (=500 000 $Ns/m^2$) has been found by extrapolation for a mixture of UP-resin containing 11.8% cellulose-ester which has also been thickened 20%. The mentioned value is the uppermost limit of the viscosity of the resin, at which a vacuum shaping of the prepreg is no longer possible.

The result of this comparison test is specifically important and notable because the resins contained commonly in prepregs thickened by MgO feature for the warm pressing procedure at room temperature a higher viscosity and feature a gelatine like not flowable consistency. These prepregs are not suitable for a vacuum shaping at ambient temperatures of room temperature.

The inventive method allows an economical and far reaching automatic treating and handling of prepregs (SMC) by utilizing simple, relatively cheap devices and at a small expenditure of energy and allows the optimal utilization of the high strength features of fibre-reinforced duroplast-plastic materials.

While there are described present preferred embodiments of the invention, it is to be distinctly understood that the invention is not limited thereto, but may be otherwise variously embodied and practiced within the scope of the following claims.

Accordingly,

What is claimed is:

1. A method of manufacturing fibre-reinforced plastic articles, said method comprising the steps of providing a planar prepreg containing reinforcing fibres impregnated by curable resins, covering at least one side of said prepreg with a flexible and stretchable resin, providing an open contoured mold, utilizing air pressure exerted on the covered side of the prepreg deforming the covered prepreg to conform to the contour of the mold, and curing the shaped prepreg thereafter, the viscosity of the totality of flowable materials present in the prepreg inclusive of possible filling agents and exclusive of any reinforcing fibres measured at the temperature of said deformation and a low shearing speed amounts to at least 10 $Na/m^2$ and less than about 100,000 $Na/m^2$ and the length of individual reinforcing fibres exceeds about 2 mm.

2. The method of claim 1, further comprising the step of covering the other side of the prepreg with the flexible and stretchable foil.

3. The method of claim 1, wherein said step of pressing the prepreg is effected by the means of vacuum shaping onto the open mold.

4. The method of claim 1, wherein the viscosity is at least about 100 $Ns/m^2$.

5. The method of claim 1, wherein the length of the reinforcing fibres is in the range from about 4 mm to about 50 mm.

6. The method of claim 1, wherein the length of the reinforcing fibres amounts to not more than about 30 mm.

7. The method of claim 1, wherein the curable resin impregnated in the prepreg is an electron beam curable resin and said step of curing is by means of such electron beam.

8. The method of claim 1, wherein the curable resin impregnated in the prepreg is an ultraviolet light curable resin and said step of curing is by means of ultraviolet light.

9. The method of claim 1, wherein the curable resin impregnated in the prepreg is a visible light curable resin and said step of curing is by means of visible light.

10. The method of claim 1, wherein the covering foil is a foil which is detachable form the cured resin and consists of a soft polyolefin.

11. The method of claim 1, wherein the covering foil is a foil which is detachable from the cured resin and consists of a polyvinylidene-chloride.

12. The method of claim 1, wherein the covering foil is a foil which strongly adheres to the cured resin after said step of curing.

13. The method of claim 12, wherein the covering foil is a vinylchloride-polymeric or -copolymeric foil containing a curable monomer.

14. The method of claim 12, further including the step of heat curing the foil wherein the side of the foil facing the open form is provided with a ray impermeable coloring.

15. The method of claim 7, wherein there is provided between the covering foil facing the open mold and the prepreg a colored thin layer which is cured by the electron beam.

16. The method of claim 8, wherein there is provided between the covering foil facing the open mold and the prepreg a colored thin layer which is cured by the ultraviolet light.

17. The method of claim 9, wherein there is provided between the covering foil facing the open mold and the prepreg a colored thin layer which is cured by the visible light.

18. The method of claim 1, wherein the curable resin is an unsaturated polyester.

19. The method of claim 1, wherein the curable resin is an unsaturated polyurethane.

20. The method of claim 18, wherein the unsaturated polyester is present as a solution in a polymerizable monomer.

21. The method of claim 19, wherein the unsaturated polyurethane is present as a solution in a polymerizable monomer.

22. The method of claim 20, wherein the polymerizable monomer is styrene.

23. The method of claim 21, wherein the polymerizable monomer is styrene.

24. The method of claim 1, wherein the viscosity of a resin having a lower viscosity is increased to the required viscosity by dissolving therein a soluble polymer.

25. The method of claim 24, wherein the increasing of the viscosity is carried out by dissolving a cellulose-ester which is soluble in a UP-resin.

26. The method of claim 24, wherein the cellulose-ester is a cellulose-acetobutyrate.

27. The method of claim 24, wherein the viscosity of the lower viscosity resin is increased by dissolving therein a soluble polymer prior to the manufacture of the prepreg.

28. The method of claim 24, wherein the viscosity of the lower viscosity resin is increased by dissolving therein a soluble polymer during the manufacture of the prepreg.

29. The method of claim 1, wherein there is provided between said covering foil and said prepreg a colored heat curable thin layer which is cured by heat.

* * * * *